US008972454B2

(12) United States Patent
Beardsmore et al.

(10) Patent No.: US 8,972,454 B2
(45) Date of Patent: *Mar. 3, 2015

(54) CAPTURING IMAGE DATA

(75) Inventors: Anthony P. Beardsmore, Southampton (GB); Oliver Fenton, Winchester (GB); Dale Lane, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1820 days.

This patent is subject to a terminal disclaimer.

(21) Appl. No.: 12/297,701

(22) PCT Filed: Apr. 17, 2007

(86) PCT No.: PCT/EP2007/053739
§ 371 (c)(1),
(2), (4) Date: Oct. 23, 2008

(87) PCT Pub. No.: WO2007/122145
PCT Pub. Date: Nov. 1, 2007

(65) Prior Publication Data
US 2011/0264709 A1 Oct. 27, 2011

(30) Foreign Application Priority Data
Apr. 20, 2006 (GB) .................................. 0607763.0

(51) Int. Cl.
*G06F 7/00* (2006.01)
*G06F 9/44* (2006.01)
(52) U.S. Cl.
CPC .................................... *G06F 9/4443* (2013.01)
USPC ....................................................... 707/802
(58) Field of Classification Search
USPC .......................................... 707/705, 790, 802
See application file for complete search history.

(56) References Cited

U.S. PATENT DOCUMENTS 5,329,613 A 7/1994 Brase et al.
5,522,025 A 5/1996 Rosenstein
(Continued)

FOREIGN PATENT DOCUMENTS

CN 1060547 A 4/1992

OTHER PUBLICATIONS

"What FullShot Screen Capture can do for you", Inbit Incorporated, http://www.inbit.com/screen-capture-2.html, Sep. 15, 2008, 2 pages.
(Continued)

*Primary Examiner* — Hosain Alam
*Assistant Examiner* — Eliyah S Harper
(74) *Attorney, Agent, or Firm* — Stephen R. Tkacs; Stephen J. Walder, Jr.; Parashes T. Kalaitzis

(57) ABSTRACT

A screen capture application captures image data by receiving a signal defining a display area for which image data is to be captured, accessing metadata relating to components within the defined display area, and, for components within the display area, storing an image of the component and storing associated position data. The screen capture application may store positional relationships between the components within the defined display area, the positional relationships including ordering of the components relative to each other. The screen capture application may store the components as a plurality of layers within a layered image file. The screen capture application may store the component images in respective files and store the position data in a control file. The control file may include details of the respective component image files.

19 Claims, 4 Drawing Sheets

(56) References Cited

U.S. PATENT DOCUMENTS

| | | | |
|---|---|---|---|
| 5,877,762 A | 3/1999 | Young | |
| 6,968,499 B1* | 11/2005 | Minami et al. | 715/205 |
| 7,249,328 B1* | 7/2007 | Davis | 715/853 |
| 7,917,466 B2* | 3/2011 | van Zee | 707/609 |
| 8,131,773 B2* | 3/2012 | Watanabe et al. | 707/802 |
| 8,250,034 B2* | 8/2012 | Manousos et al. | 707/638 |
| 2002/0054148 A1 | 5/2002 | Okada | |
| 2002/0089499 A1 | 7/2002 | Lee et al. | |
| 2004/0015783 A1* | 1/2004 | Lennon et al. | 715/523 |
| 2005/0030588 A1* | 2/2005 | Reese et al. | 358/3.28 |
| 2005/0050043 A1* | 3/2005 | Pyhalammi et al. | 707/6 |
| 2005/0198042 A1* | 9/2005 | Davis | 707/10 |
| 2005/0234884 A1* | 10/2005 | Drukman et al. | 707/3 |
| 2006/0041564 A1* | 2/2006 | Jain et al. | 707/100 |
| 2006/0061595 A1* | 3/2006 | Goede et al. | 345/619 |
| 2006/0101068 A1* | 5/2006 | Stuhec et al. | 707/103 R |
| 2006/0209061 A1* | 9/2006 | Burch et al. | 345/419 |
| 2007/0016557 A1* | 1/2007 | Moore et al. | 707/3 |

OTHER PUBLICATIONS

"Project Looking Glass", Sun Microsystems, http://www.sun.com/software/looking_glass/, printed Oct. 7, 2008, 1 page.

ImageMagick, Application Program Interfaces, http://www.imagemagick.org/script/api.php, printed Oct. 7, 2008, 3 pages.

* cited by examiner

CAPTURING IMAGE DATA

TECHNICAL FIELD

The present invention relates to a method and a system for capturing image data.

BACKGROUND

The Microsoft Windows® operating system provides a function that allows a user to capture the contents of their screen (which is copied to the virtual "clipboard") when the user presses "Print Screen" on the keyboard. Other operating systems provide similar functions. There are also a variety of software applications available which provide more advanced forms of this function. These applications sometimes extend the capabilities of the screen capture to include selecting specific windows to be captured, or allow the editing of the captured image before saving or exporting the image.

When multiple components such as overlapping windows are present on the display device that a user is viewing, typical screen capture applications lose hidden information (i.e. information on lower windows) during the screen capture function, unless individual components are specifically extracted into separate image files. For example, Capture Professional, published by Softworx Inc. allows a user to select multiple components within the display area. These may be, for example, two overlapping windows. In this case, the software then gives the user the choice between creating two separate images, which loses the actual look of the screen, or creating a single image of the two windows as they are presently displayed, in which case data on the partially obscured window is lost.

SUMMARY

According to a first aspect of the present invention, there is provided a method in a computing system of capturing image data. The method comprises receiving, in a processor of the computing system, a signal defining a display area on a display device of the computing system for which image data is to be captured; accessing metadata relating to a plurality of components within the defined display area; and, for each selected component within the plurality of components within the defined display area, storing an image of the selected component and storing associated position data.

According to a second aspect of the present invention, there is provided a system for capturing image data comprising: a display device arranged to display image data; a user interface arranged to generate a signal defining a display area for which image data is to be captured, in response to a defined user input; and a processor arranged to access metadata relating to a plurality of components within the defined display area, and, for each selected component within the plurality of components within the defined display area, to store an image of the selected component and to store associated position data.

According to a third aspect of the present invention, there is provided a computer program product comprising a computer recordable medium having a set of instructions for capturing image data recorded thereon. The set of instructions, when executed by a computing system, causes the computing system to receive a signal defining a display area for which image data is to be captured, access metadata relating to a plurality of components within the defined display area, and, for each selected component within the plurality of components within the display area, store an image of the selected component and store associated position data.

These and other features of the illustrative embodiments will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Owing to the illustrative embodiments described herein, it is possible to enable an automated screen capture of multiple displayed components (windows for example) without the loss of any hidden information and while maintaining the visible appearance of the display area. This may involve capturing all of the components shown on a screen, although the user may select only a subset of those displayed. The screen capture method of the illustrative embodiments implicitly or explicitly captures the positional relationships between the displayed components that are being captured in the process.

In one illustrative embodiment, the steps of storing an image of a component and storing associated position data are executed for each and all components within the display area. Alternatively, the steps of storing an image of a component and storing associated position data are executed for user-selected components within the display area. The process is sufficiently flexible to support either the capture of all displayed components or a user selection of the components to be stored. In most situations the user will execute a simple action such as pressing a button on their keyboard to launch the screen capture, as is conventional. A more complex interface can be used, allowing the user to define the display area that is being captured. This display area may be a portion of the display device in front of the user or may be larger than the screen they are currently viewing, for example encompassing the displayed contents of several display devices, as the use of multiple display devices is becoming more widespread.

Advantageously, the component images and associated position data are stored in a single file. Each image is stored as a layer in the single file. In the situation where a user selects the capture of everything that is displayed, a single image in a layered format is created from all of the components on the desktop, including the desktop itself as a layer. This means that the relationships between windows are implicitly captured in the single resulting file, the layering (x is on top of y) and positioning (x is 3 pixels to the left of y and 25 pixels higher) being position data stored along with the images of the components captured.

Alternatively, the component images are stored in respective files and the position data is stored in a control file, the control file including details of the respective component image files. This embodiment of the capture method stores the image of each captured component in a separate image file, such as a jpeg file. In addition to the files of the individual components, a control file is also created which contains the position data that relates the component image files together. This could be stored in a simple XML format file, for example.

Figure 1:
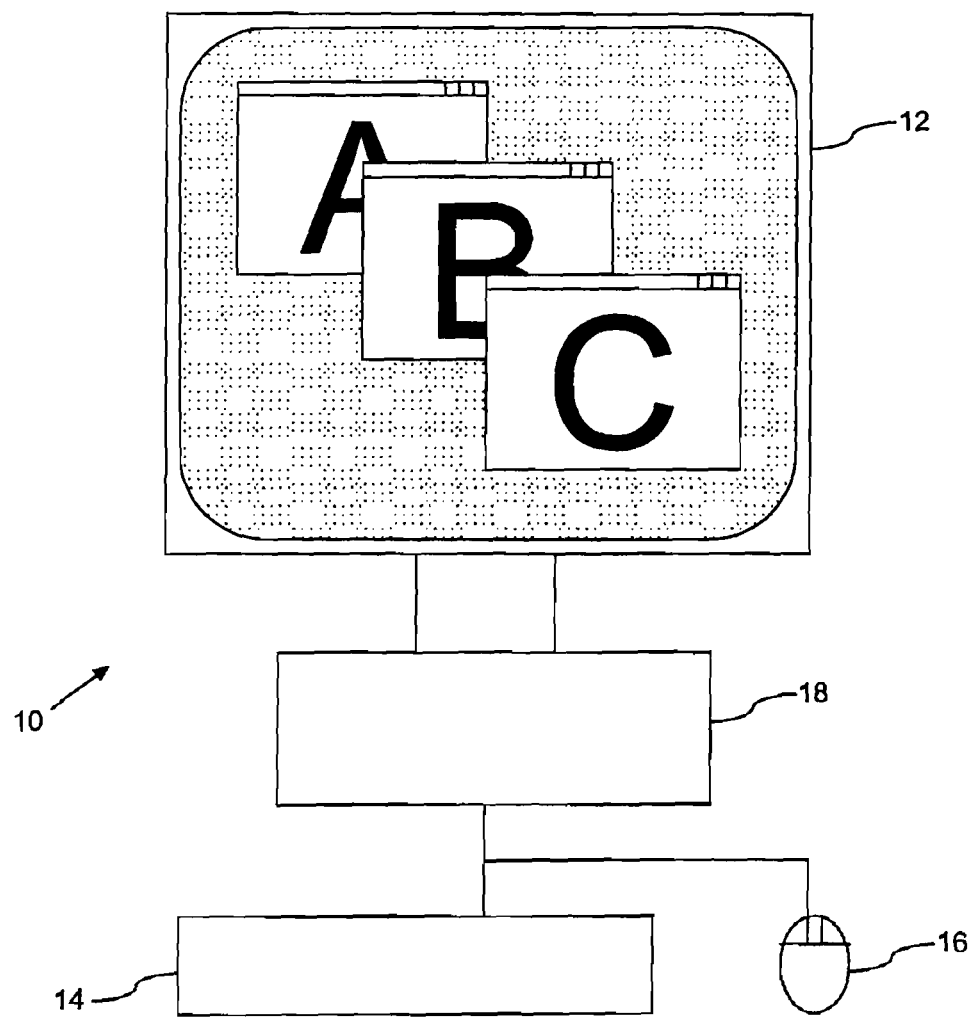
FIG. 1 is a schematic diagram of a computing system in accordance with an illustrative embodiment.

FIG. 1 shows a computing system 10 which can be utilised for capturing image data in accordance with an illustrative embodiment. The system 10 comprises a display device 12 which is any suitable display device used to display image data, user interface devices being a keyboard 14 and a mouse 16 and a processor 18. The processor 18 receives inputs from the keyboard 14 and the mouse 16 and controls the image on the display device 12, as is conventional in the art.

The display device 12, in the example of FIG. 1, is shown as displaying three cascading windows A, B and C. These windows are illustrated with a large single letter for ease of understanding, although in a practical embodiment of the system 10, each window displayed by the display device 12 will carry detailed information, for example, an image file of a photograph, or a word processing document, or an Internet browser.

In a similar fashion, behind the three windows, the user's desktop is visible, which can be considered to be a window of the same size as the display area of the display device 12. The desktop is behind the three windows A, B and C, and is shown as an expanse of dots to ease understanding. The two windows A and B each have a certain amount of their display area obscured by another window.

When a user wishes to capture the image displayed by the display device 12, then the processor 18 is arranged to generate a signal defining a display area for which image data is to be captured, in response to a defined user input. In the simplest scheme, the user presses the "Print Screen" button on the keyboard 14, as the defined user input, and the entire display area of the device 12 is captured. More complex arrangements are possible that capture only some of the components on the display device 12.

Once the processor 18 has received the signal from the user, via the keyboard 14, to capture the image data, then the processor 18 will access metadata relating to the different components within the defined display area that is being captured. In the example of FIG. 1, if the user is capturing the entire display, then there are four components that the processor 18 needs to capture; the three windows A, B and C, and the background desktop.

The processor 18 is able to access the displayed windows, programmatically via the operating system. A suitable programming API interface for the specific operating system is used that allows applications to interact with other windows. The processor 18 is running such an application, which allows the processor to access information (metadata) on the components displayed by the device 12.

For example, in the Visual Basic programming language, there is an API for interacting with the Microsoft Windows® operating system which includes the ability to get an array of handles to all of the windows known to the operating system. With a handle to a window, the processor 18 (executing a suitable application calling the API) can get a variety of information about any specific window.

The metadata that can be accessed includes things such as the window title (text displayed on the title bar), the window dimensions (width and height in pixels), whether or not the window is visible (minimized), the z-depth of the window (allowing the application to identify the order of the windows from conceptual 'front' to 'back' of the display), the location of the window (given in x and y coordinates of the upper-left corner), and a bitmap image of the appearance of the chosen window. The processor 18, through this API, can also interact with each window programmatically to be able to minimize (i.e. hide) and restore (i.e. show) specific windows.

The different components that make up the image displayed by the display device 12, such as the individual windows and the desktop background each have associated metadata, such as the information listed above, including such things as the position and size of the component.

Figure 2:
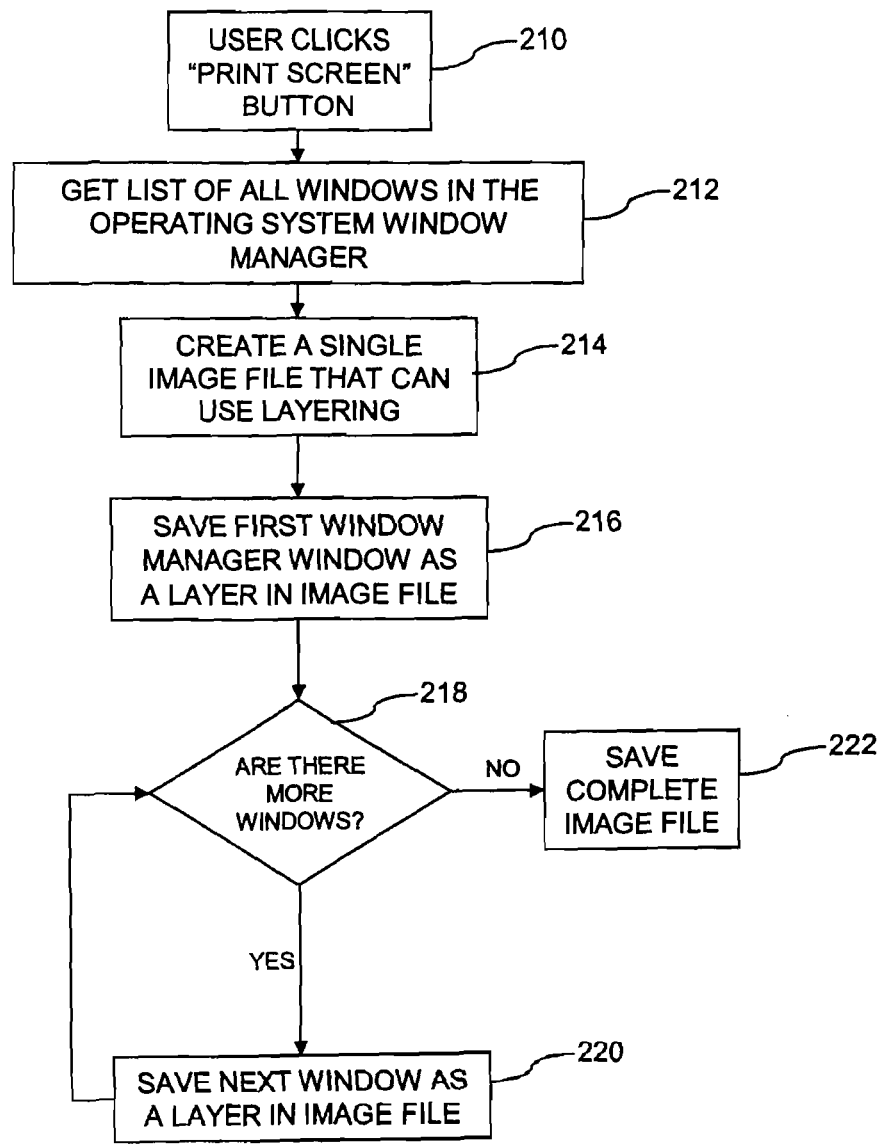
FIG. 2 is a flow diagram depicting operation of capturing image data in accordance with an illustrative embodiment.

FIG. 2 illustrates a first embodiment of the method executed by the processor 18 when carrying out this screen capture function. At step 210, the user begins the process by requesting that screen capture takes place. The processor 18, in response to receiving the request for capture, at step 212, accesses metadata relating to the components making up the display. This can be via a suitable API, as mentioned above, which can query the data held by the operating system on the specific windows that exist at that particular moment. The operating system, in the same step, can be queried to obtain information about the desktop (the background) of the user.

In this first embodiment of the screen capture method, the processor 18 will capture the individual components of the display into a single file. For the components within the display area, an image of the component and associated position data is stored in this single file. One way that this can be achieved is by using an image format that supports layers, with each component image file being stored as a separate layer. At step 214, the processor 18 will create a single image file that uses layering.

The processor 18 makes use of image file formats that support an image made up of multiple layers. A number of both proprietary and open-source file formats include this functionality, such as .psd files (Photoshop® photo editing software from Adobe), .psp files (supported by Paint Shop Pro® photo editing software from Corel) and .xcf files (supported by GIMP, open source). All of these image formats support a number of ways to manipulate the layers, such as being able to selectively move a layer independently of any other layer, and to hide one or more layers when viewing the image, usually from a palette view showing each layer as a separate thumbnail which can be toggled between show/hide. All of these file formats support transparency in the layers, ensuring that parts of a layer that are not drawn on do not obscure images on layers below.

At step 216, the processor 18 stores an image of the first component, which is the desktop image. The processor 18 then cycles through the steps 218 and 220, saving each of the other components in the defined display area as individual layers within the image file. Once all of the components have been captured as individual image files, operation terminates at step 222. Position data associated with the individual images is also stored in the single file. This data can be a simple ordering of the image layers, which effectively gives a front to back position of the individual components in the file, or may be more detailed information such as the actual x and y co-ordinates of each component, acquired by the processor 18 from the metadata stored by the operating system.

Figure 3:
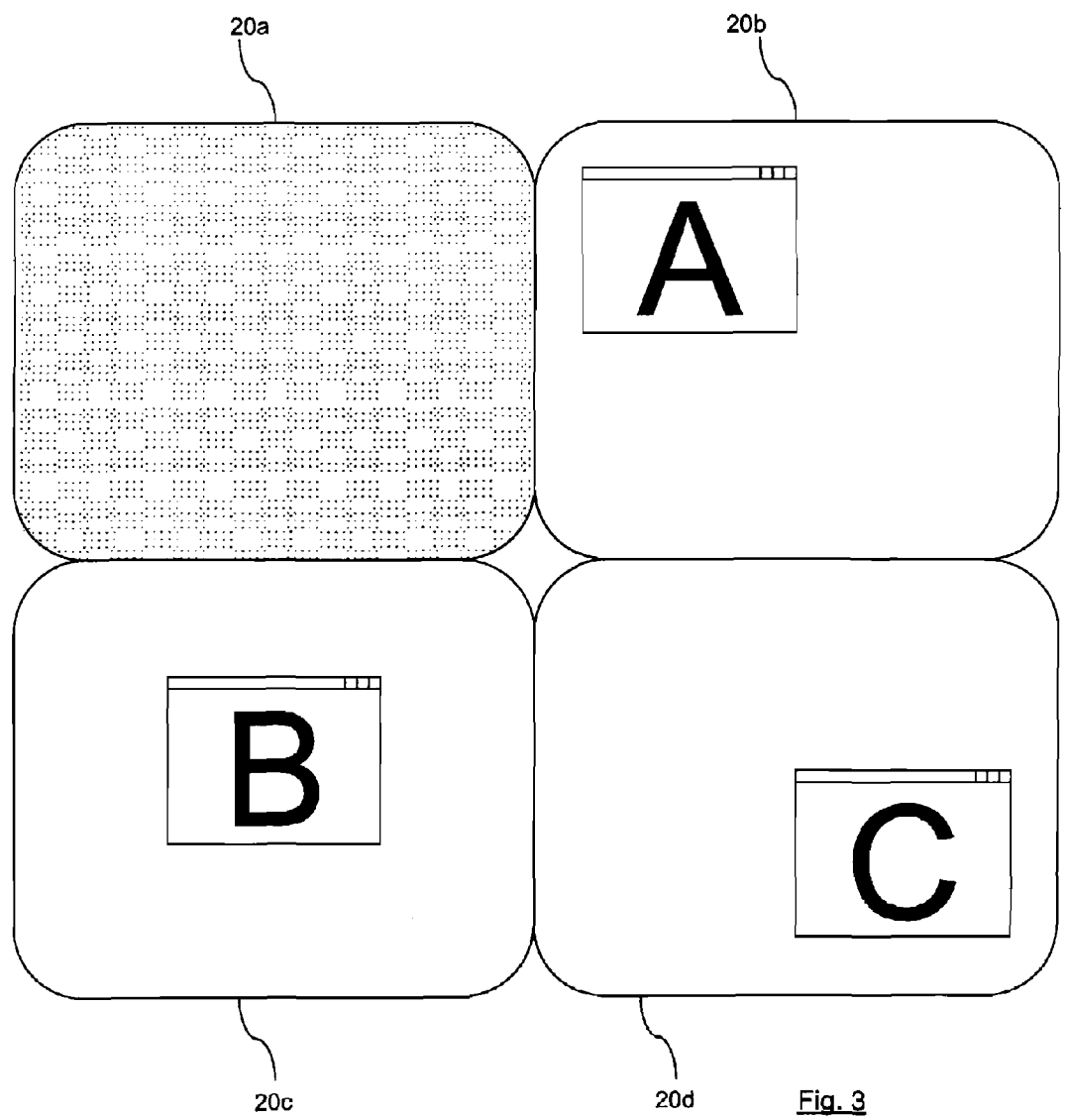
FIG. 3 is a schematic diagram of an image file including multiple image layers in accordance with an illustrative embodiment.

FIG. 3 shows the four components of FIG. 1, as they will be captured in a single image file that supports layers in accordance with an illustrative embodiment. The four layers 20a-20d are each individually captured, in back to front order, with layer 20a being the desktop of the user (containing icons for applications and shortcuts and so on) and the layers 20b to 20d are each individual component windows, with all of the image data for the window being captured in the file and saved as a layer. The four layers 20a-20d are shown as forming a square, but this is used for ease of explanation; in reality the layers 20a-20d will be stored as being in z-depth order, which constitutes position information about each layer 20a-20d, stored in the single file.

The entirety of the images of the individual components (including the desktop) has been recorded in this layered image file. When this image file is viewed in the appropriate application, the original screen image will be seen as it was when the user pressed the button to trigger the screen capture process, but all of the information in the parts of the windows and desktop that are obscured by other windows is also present within this single file, and the viewer of the file can access the images of the individual components by manipulating the layers within the file.

For example, if the viewer of the file wishes to look at the whole of the window "A", then they can bring that layer to the front, or they can delete or hide the layers that are in front of the specific layer that they wish to access. An intelligent screen capture has been executed that allows the user to access more than just the original screen image. Obscured data can be captured and subsequently accessed.

In the example of FIGS. 1 to 3, the obscured data that is captured in the single file comprises those elements of the displayed components that are obscured by other components. Other types of obscured data can also be stored in the screen capture method of the invention. For example, if a window is so positioned that some of its contents are "off the side" of the display device 12, then the entire window will still be captured and a user manipulating the ultimate file storing the different components will be able to access the data that was not shown on the original screen display on the device 12.

Similarly, if any component such as a window is displayed in such a manner that a scroll bar needs to be used, so that not all of the window's data is currently displayed by the window, then the processor 18, when capturing the individual component window can also capture the unseen parts of this window. This can be achieved by using an API that will allow scrolling of the contents of any individual window or expansion of the window to capture all of the data of that window. Some common file formats that support layering will require amendment to support this function, but it can be achieved, for example, in the alternative embodiment discussed below with reference to FIG. 4.

Likewise, if any window is currently open but minimized, so that only its title is shown on the taskbar (in the Windows® operating system), then the processor, when executing the screen capture operation can also cycle through all minimized windows and arrange for them to be maximized and captured and then minimized again. The end result of this process will be that the image file containing the layers will, when opened in a suitable viewer, still look like the original screen display on the display device 12, but the minimized components seen on the desktop will be captured in the file as individual layers, capable of being viewed by the end user.

If the user is using multiple display devices in a system known as a virtual desktop, then when the user executes the screen capture function they can capture all of the information on all of the display devices that they are currently using. The processor 18 begins the screen capture after receiving a signal defining a display area for which image data is to be captured. The display area can therefore be that of multiple display devices.

The processor accesses the operating system and acquires all of the information on the multiple desktops and all of the windows currently in use. These are then captured in turn with the relevant position information and stored in a single file. When a user opens the resulting file they will see an image that corresponds to the image on the main display of the user, but scroll bars will be present that allow them to see the other parts of the virtual desktop. In effect a file is created that has an image that is the size of the virtual desktop. Individual windows will be present as layers and can be accessed individually with no loss of obscured data.

Similarly, if the user has a virtual three-dimension (3D) desktop, then this image and the logical relationships within the components in the virtual 3D environment are maintained. A 3D desktop is usually viewed as a conventional 2D desktop, through a flat viewing device, with a concept of orientation and z-axis positioning of objects in the desktop space (a window can be not just behind another window, but 'x units' behind it, or may be viewed obliquely, or even conceptually moved behind or to the side of the user). Rather than capturing the viewable area, the conceptual 3D space would be captured in its entirety (or through some selection mechanism), when the user initiates the screen capture function, by pressing a button on the keyboard. Sun's experimental 3D desktop and a possible 3D file format give further information on 3D desktops.

Figure 4:
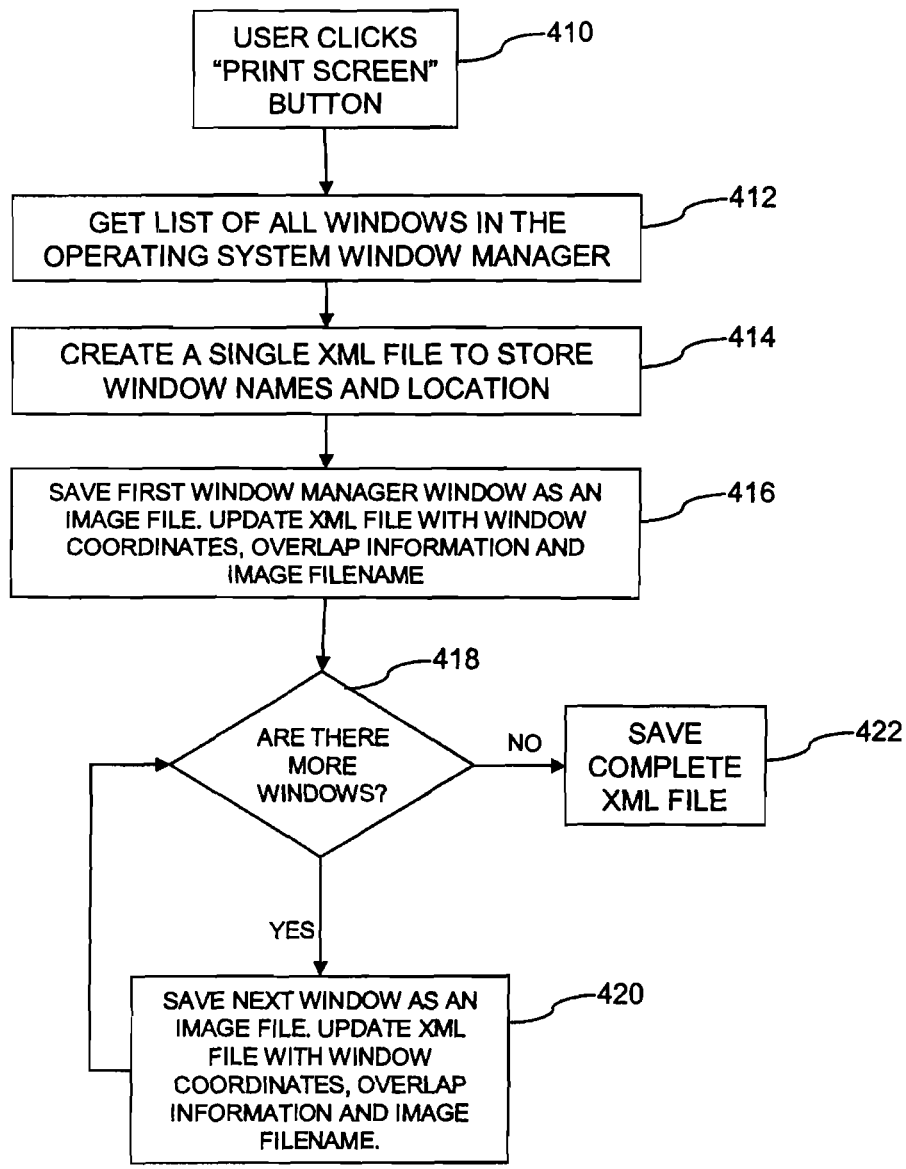
FIG. 4 is a flow diagram depicting alternative operation of capturing image data in accordance with an illustrative embodiment.

FIG. 4 shows an alternative embodiment of executing screen capture. The user gives the instruction to carry out the display capture, at step 410. As in the first embodiment (FIG. 2), the processor 18, on receiving the signal to initiate the screen capture, accesses the operating system to acquire details of the windows currently in existence. This will be a list of the windows and metadata about those components including the images of the windows, their position, whether they are minimized, and so on.

The second methodology is distinguished from that of the first embodiment in that the images of the components are not saved in a single file. In this embodiment, the component images are stored in individual files and the position data is stored in a control file, the control file including details of the component image files. At step 414 the control file is created as an XML file.

At step 416, the first component of the display is stored as an individual image file in a conventional file format such as .jpg, with information relating to that image being stored in the control file. Steps 418 and 420 are then repeated for each component that is being captured, with operation terminating at step 422 when all such components have been stored. The end result of the second embodiment of the capture operation is a set of image files and an XML control file that includes position data that can be used to reconstruct the original screen display from the contents of the various image files that each contains a representation of a screen component. As in the first embodiment, obscured detail of the individual components is maintained and stored in the image files.

In both of the embodiments of the image capture operation it may be necessary to programmatically manipulate the images that are being stored. Many programming languages provide the ability to manipulate images, including the ability to resize and to convert between image formats. Visual Basic, for example, provides the ability to get a bitmap image of a window if the details of the window are acquired from the operating system. Visual Basic libraries also provide the ability to convert this bitmap into a variety of image formats. Libraries exist to provide this ability for the image formats described above with reference to the first embodiment, for example, ImageMagick libraries provide programmatic interfaces for a variety of programming languages that support the creation of .xcf (GIMP) images with multiple layers. This image manipulation may be required to convert the format of the image acquired for a specific component into a format that can be utilised by the capturing method, for example, when creating an image file that supports the use of layers.

The invention claimed is:

1. A method, in a computing system, of capturing image data comprising:
   displaying a plurality of graphical user interface components on a display device of the computing system;
   receiving, in a processor of the computing system, an input signal defining a display area on a display device of the computing system for which image data is to be captured;
   accessing metadata relating to the plurality of graphical user interface components within the defined display area;
   for each selected graphical user interface component within the plurality of graphical user interface components within the defined display area, storing an image of the selected graphical user interface component and storing associated position data, wherein the associated position data comprises positional relationships between the plurality of graphical user interface components within the defined display area, the positional relationships including ordering of the plurality of graphical user interface components relative to each other; and
   generating a layered image capture of the display area comprising the stored image and associated position data for each selected graphical user interface component within the defined display area.

2. A method according to claim 1, wherein the stored positional relationships include a z-axis depth value in addition to x-axis and y-axis values in a three dimension virtual desktop environment.

3. A method according to claim 1, wherein a plurality of images, corresponding to the plurality of graphical user interface components within the defined display area, are stored as a plurality of layers within a layered image file.

4. A method according to claim 1, wherein the plurality of graphical user interface components comprises a desktop background and one or more windows.

5. A method according to claim 1, wherein each selected graphical user interface component is a selected user specified component within the display area.

6. A method according to claim 1, wherein the selected component images and associated position data are stored in a single file.

7. A method according to claim 6, wherein each selected component image is stored as a layer in the single file.

8. A method according to claim 1, wherein the selected component images are stored in respective component image files and the position data are stored in a control file, the control file including details of the respective component image files.

9. A system for capturing image data comprising:
   a display device arranged to display image data comprising a plurality of graphical user interface components;
   a user interface arranged to generate an input signal defining a display area for which image data is to be captured, in response to a defined user input;
   a processor arranged to access metadata relating to the plurality of graphical user interface components within the defined display area, and, for each selected graphical user interface component within the plurality of graphical user interface components within the defined display area, to store an image of the selected graphical user interface component and to store associated position data, wherein the associated position data comprises positional relationships between the plurality of graphical user interface components within the defined display area, the positional relationships including ordering of the plurality of graphical user interface components relative to each other; and
   the processor arranged to generate a layered image capture of the display area comprising the stored image and associated position data of each selected graphical user interface component within the defined display area.

10. A system according to claim 9, wherein the plurality of graphical user interface components comprises a desktop background and one or more windows.

11. A system according to claim 9, wherein the selected component images and associated position data are stored in a single file.

12. A system according to claim 11, wherein each selected component image is stored as a layer in the single file.

13. A system according to claim 9, wherein the selected component images are stored in respective component image files and the position data are stored in a control file, the control file including details of the respective component image files.

14. A computer program product comprising a non-transitory computer readable medium having a set of instructions for capturing image data recorded thereon, wherein the set of instructions, when executed by a computing system, causes the computing system to:
   displaying a plurality of graphical user interface components on a display device of the computing system;
   receive an input signal defining a display area for which image data is to be captured;
   access metadata relating to the plurality of graphical user interface components within the defined display area;
   for each selected graphical user interface component within the plurality of graphical user interface components within the display area, store an image of the selected graphical user interface component and store associated position data, wherein the associated position data comprises positional relationships between the plurality of graphical user interface components within the defined display area, the positional relationships including ordering of plurality of graphical user interface components relative to each other; and
   generate a layered image capture of the display area comprising the stored image and associated position data of each selected graphical user interface component within the defined display area.

15. A computer program product according to claim 14, wherein the plurality of components graphical user interface comprises a desktop background and one or more windows.

16. A computer program product according to claim 14, wherein each selected graphical user interface component is a selected user specified component within the display area.

17. A computer program product according to claim 14, wherein the selected component images and associated position data are stored in a single file.

18. A computer program product according to claim 17, wherein each selected component image is stored as a layer in the single file.

19. A computer program product according to claim 14, wherein the selected component images are stored in respective component image files and the position data are stored in a control file, the control file including details of the respective component image files.

* * * * *